April 15, 1924.
A. J. SIMMONS
LIQUID DISPENSING DEVICE
Filed May 25, 1923 4 Sheets-Sheet 2
1,490,134
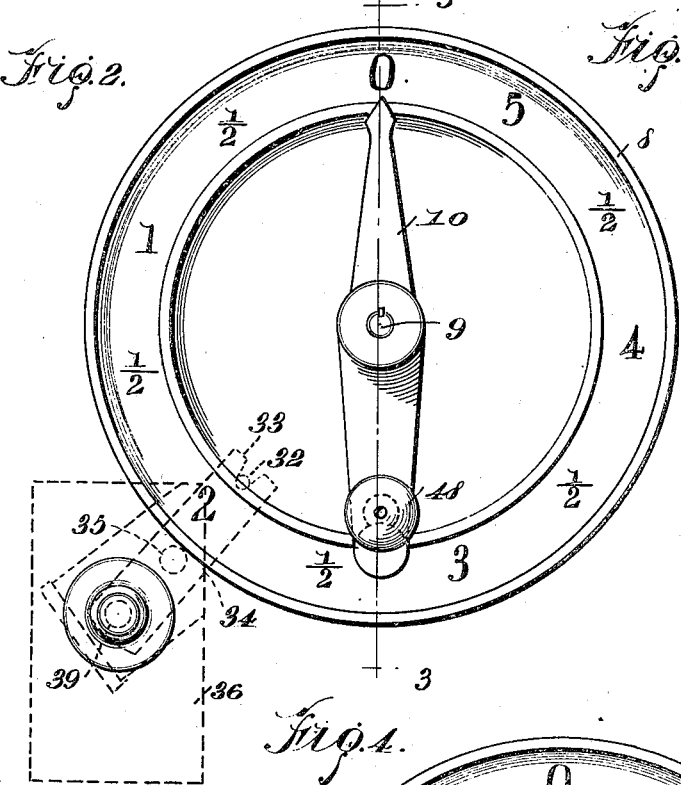
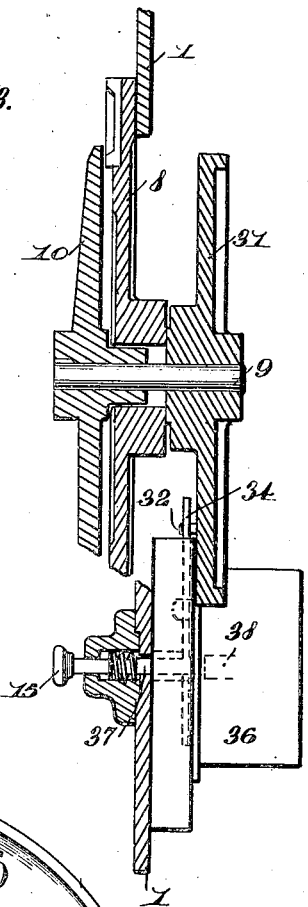
WITNESSES
M. Fowler
Harry E. Seidel
INVENTOR
A. J. Simmons.
BY
Munn & Co
ATTORNEYS

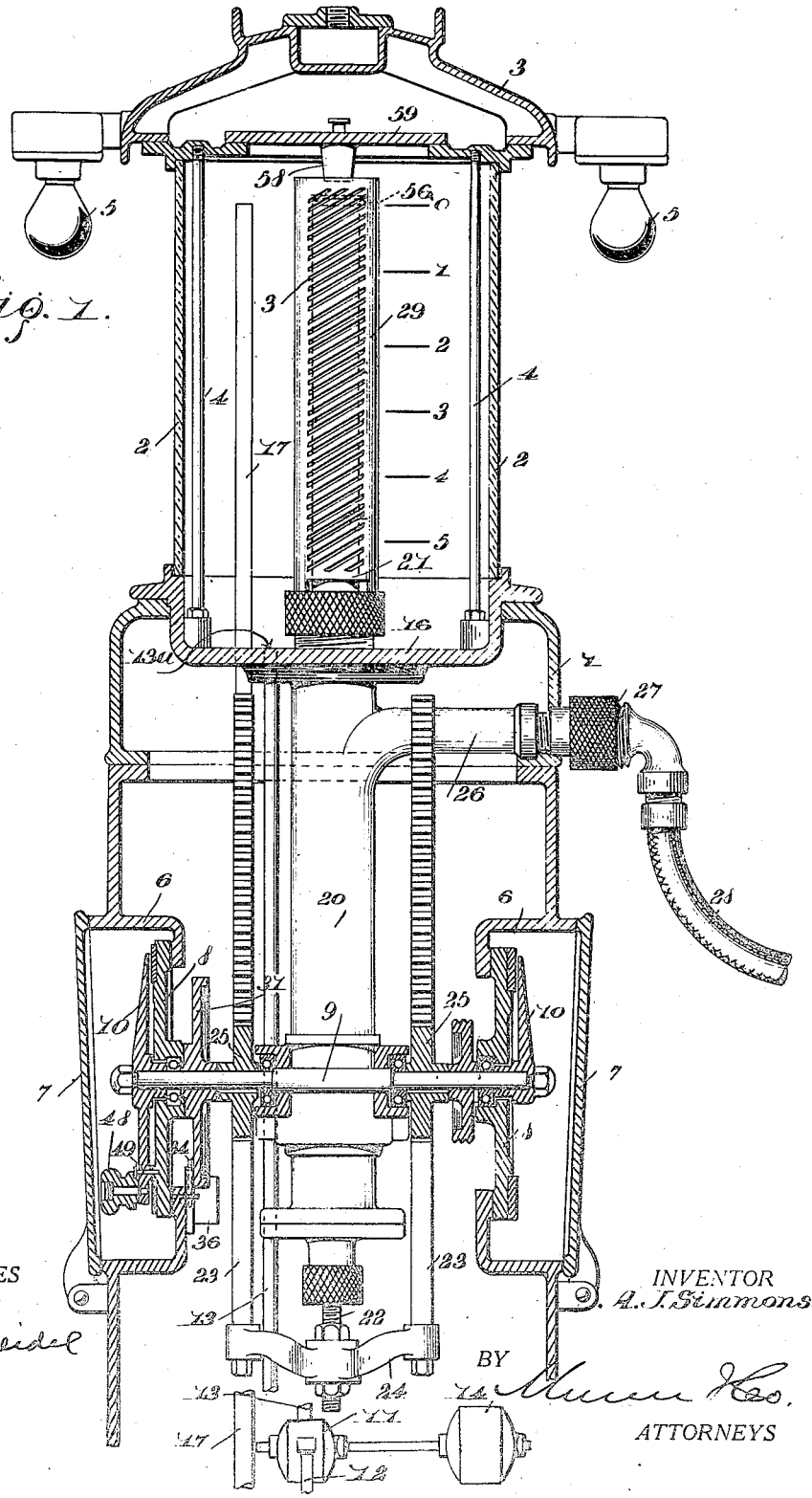

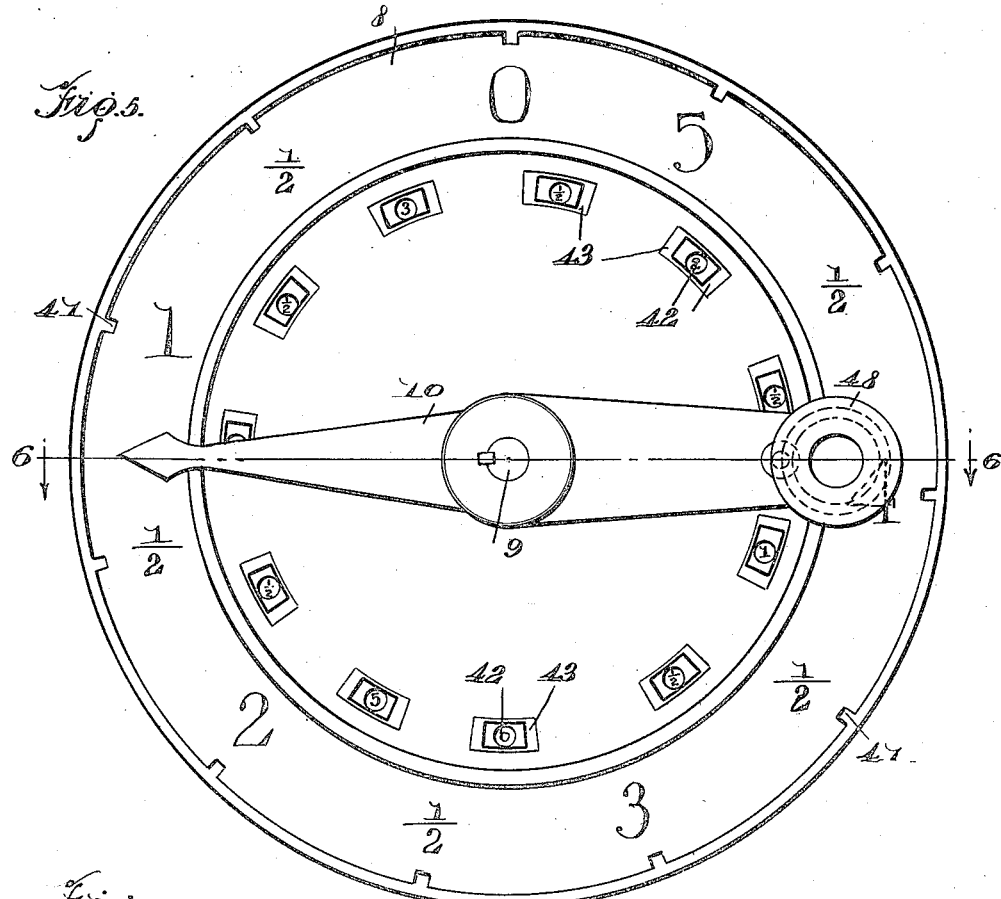
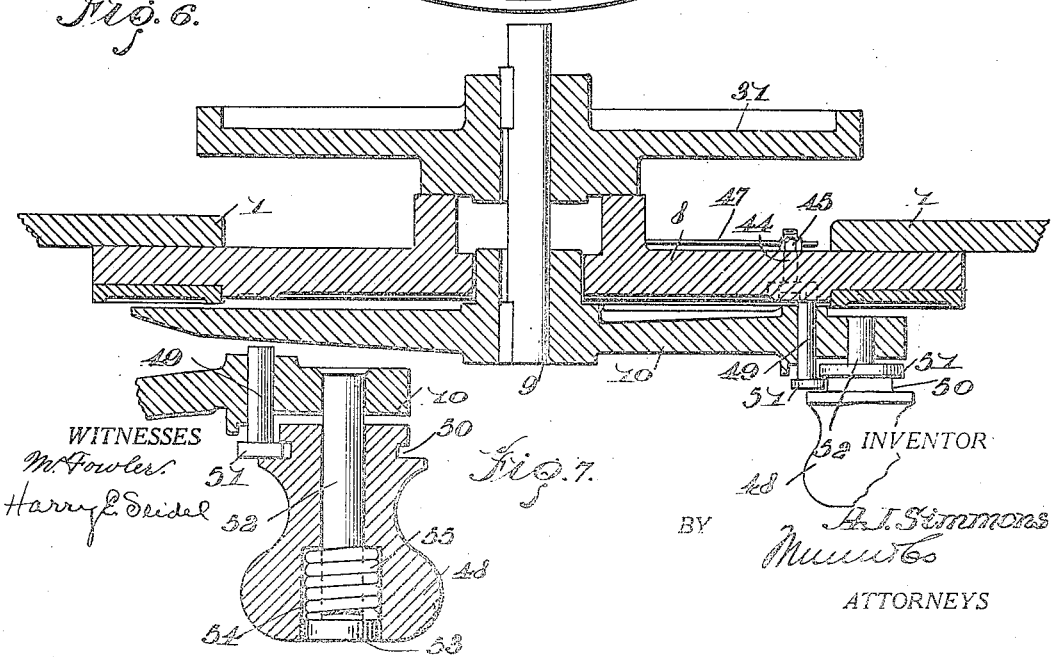

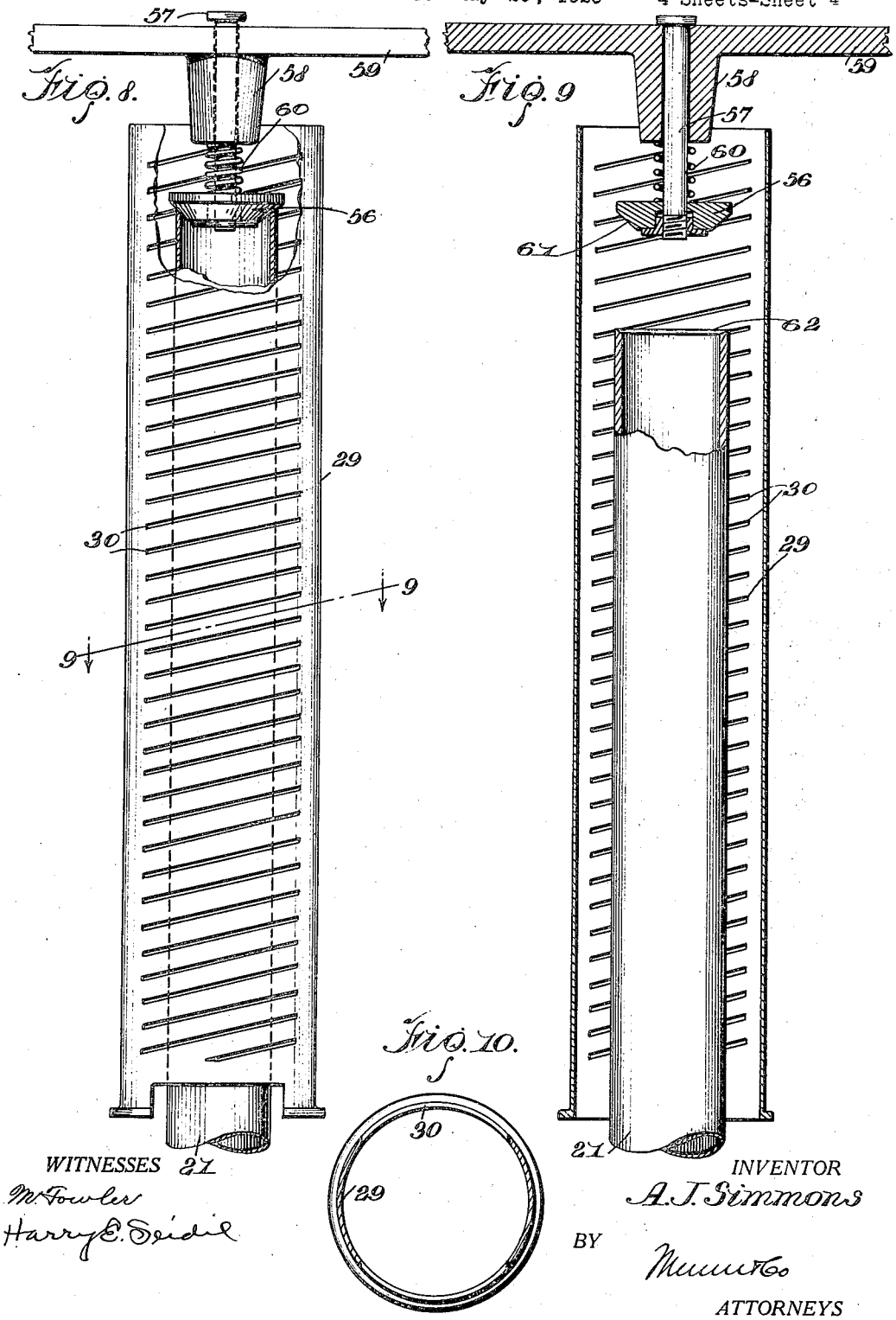

Patented Apr. 15, 1924.

1,490,134

UNITED STATES PATENT OFFICE.

ARCHIE J. SIMMONS, OF LOUISVILLE, KENTUCKY.

LIQUID-DISPENSING DEVICE.

Application filed May 25, 1923. Serial No. 641,454.

*To all whom it may concern:*

Be it known that I, ARCHIE J. SIMMONS, a citizen of the United States, and a resident of Louisville, in the county of Jefferson and State of Kentucky, have invented certain new and useful Improvements in Liquid-Dispensing Devices, of which the following is a specification.

This invention relates to improvements in oil dispensing devices and is more particularly adapted to that type of oil dispensing machine described and claimed in my copending application filed March 18, 1922, Serial No. 544,743.

An object of the invention is the provision of a dispensing device having a pump for delivering oil through the device with an indicating means for predetermining the quantity of oil to be dispensed from the device by gravity and with means automatically operated by the indicating means to prevent unauthorized delivery of oil to the dispensing means before the indicator has been reset to its normal inoperative position.

A further object of the invention is the provision of a dispensing means having an indicator dial and a dial hand operated in conjunction therewith for disclosing the quantities of oil dispensed from the device and for predetermining the amounts of oil dispensed therefrom with means for automatically and positively locking the indicator hand in absolute register with the amounts designated on the face of the dial. Means are also provided to present tampering with the locking means for the indicator hand.

Another object of the invention is the provision of a dispensing device having a discharge chamber and a discharge metering piston operating therein for dispensing definite quantities of liquid from said chamber with a self-cleaning filter embracing the discharge piston to prevent foreign matter from coming into contact with the piston. Said discharge piston filter likewise prevents moisture from being dispensed through the discharge piston from the device.

Other objects and advantages will become apparent during the course of the following description.

The invention is illustrated by way of example in the accompanying drawings, in which, Figure 1 is a vertical section of my improved dispensing device.

Figure 2 is a front view of an indicator disclosing the indicator dial at zero position and the push button for operating the usual pumping motor in an unlocked position.

Figure 3 is a vertical section taken along the line 3—3 of Figure 2.

Figure 4 is a front view of the indicator with the dial hand in position for releasing a predetermined quantity of oil from the dispensing device and showing the usual push button for starting the pump motor locked against movement.

Figure 5 is a front view of an indicator disclosing means for positively locking the indicator hand in position for dispensing definite quantities of liquid.

Figure 6 is a horizontal section of the indicating device taken along the line 6—6 of Figure 5.

Figure 7 is an enlarged sectional view of the operating handle for the dial hand.

Figure 8 discloses in vertical elevation a filter for the metering or dispensing plunger and a valve for automatically closing the upper end of the dispensing plunger when the indicator hand is located at zero.

Figure 9 is a vertical section of the filter and automatic valve shown in Figure 8.

Figure 10 is a transverse section taken along the line 9—9 of Figure 8.

Referring in detail to the drawings, my improved dispensing device includes a hollow standard or casing 1 surmounted by a transparent container 2 preferably of glass. A cap 3 is supported by means of uprights 4 rising within the glass container and serving to support the cap as a closure for the open end of the glass container. Radially disposed arms projecting from the periphery of the cap 3 are provided with lamp globe 5 for advertising at night the location of the dispensing device or filling station.

A pair of depressions or pockets 6 in the opposite side walls of the standard 1 are normally concealed by a pair of doors 7 hinged at their lower edges. Indicating dials 8 are mounted in the pockets and a transverse shaft 9 extending through the casing carries indicating hands 10 adapted to be operated over the faces of the dials.

A pump 11 located in the bottom of the standard is adapted to pump oil from a supply line 12 connected from any suitable source of supply to the container 2 through a delivery or inlet pipe 13, which opens at 13ª in the bottom of the container 2.

Any suitable type of operating means for the pump 11, such as an electric motor 14, may be employed. The motor 14 is set in motion by operating a switch handle 15 which causes closing of a circuit to the motor 14. Said switch is located within the pockets 6 and adjacent the periphery of the indicating dial 8. The door 7 when closed and locked prevents unauthorized tampering with the switch at all times.

Through the bottom 16 of the container 2 is inserted an overflow pipe 17 having its upper end in a plane which passes through the indicating mark designated zero of a scale which is formed upon the glass tube. The pipe is an overflow pipe which will maintain the liquid pumped through the container 2 at a level with the mark designated zero. The scale ranges from zero downwardly to any number for indicating the number of gallons dispensed from the casing 2. These graduations correspond to the graduations upon the face of the dial 8.

Directly below the container 2, I provide an oil discharge chamber 20 which is connected with the container through a hollow discharge piston 21 connected with an operating rod 22 and is adapted to be moved vertically by the racks 23 connected to a yoke 24. Gears 25 which mesh with the racks 23 operate the racks. The gears 25 are keyed to the shaft 9 and are operated simultaneously with the operation of the dial hand 10. A discharge pipe 26 leads from the chamber 20 and is connected through a movable joint 27 with a discharge hose 28.

A filter 29 which is cylindrical in form and provided with a plurality of diagonally disposed slits 30 surrounds the discharge metering piston 21 so that oil from the container 2 must pass through the slits 30 of the filter before it can come into contact with the discharge piston 21. This filter also prevents moisture, if any, from entering the discharge piston and makes it impossible to dispense anything but pure liquid through the discharge pipe 28. This filter is washed by the liquid which is pumped into the glass container 2 and all foreign matter will thus fall and collect at the bottom 16 of said container.

Referring more particularly to the indicating device located in the pocket 6 it will be seen that the operation of the indicating hand from zero to 1, 2, 3, or 5 on the dial will lower the discharge piston 21 to the corresponding numerals of the scale located on the glass container 2. It is possible unless protected from unauthorized manipulation to discharge a certain number of gallons of oil from the container 2 and then operate the pump to refill the container without operating the indicator hand 10 and thus discharge more oil from the dispensing device than is shown by the indicator.

In order to prevent this I have provided a means for locking the switch handle or control 15 from manipulation until the indicator hand has been returned to the zero position. In order to accomplish this result I have provided an annular locking plate 31 rigidly connected with the shaft 9 and simultaneously operated with the said shaft and indicator hand. This plate is provided with a pin 32 rigidly secured in such a position that it will always engage within a notch 33 of a locking bar 34 pivotally mounted at 35 on the switch controlled boss 36 when the hand 10 is located at zero position as shown in Figure 2. This bar 34 is adapted to be operated between the two contact members 37 and 38 and is provided with a perforation 39 at its inner free end adapted to aline with a passage 40. When the alinement occurs, the contact member 37 may be moved to engage the contact member 38 by operating handle 15 and only when the dial hand 10 is located at the zero position.

When the dial hand 10 is moved from zero to 1, 2, 3, or any other numeral on the dial, the locking plate through the pin 32 rocks the bar 34 on its pivot and the pin is carried out of the notch 33. The locking bar 34 is then moved to the position shown in Figure 4 and the perforation 39 is moved out of alinement with the perforation 40 and the end of the bar is in crossed relation with the perforation 40 so that it will be impossible to move the contact member 37 into engagement with the contact member 38 and start the motor in operation.

When the dial hand 10 is returned in the direction indicated by the arrow in Figure 4 to zero, the pin 32 will again engage notch 33 and as the dial hand is continued in its movement and located in alinement with the zero position the pin will have caused the locking bar 34 to be so positioned that the perforation 39 will aline with the perforation 40.

The switch may then be operated for forcing the contact 37 through the perforation 39 to engage the contact 38 of the circuit to the motor and thereby close said circuit.

In order that the dial hand 10 may be automatically locked in position to aline with the indicating marks 41 on the dial 8 and which marks are located in alinement with the numerals for indicating a definite quantity of oil to be dispensed I have provided indentations 42 in arcuately shaped blocks or nuts 43 mounted in pockets spaced at intervals around the face of the dial. As shown more particularly in Figure 6 these nuts are held in place by means of bolts 44 having their ends in threaded engagement with a threaded recess in the rear face of said blocks. The outer ends of said bolts are also threaded and engaged by a nut 45 for locking the blocks 43 within their pockets and to the face of the dial 8. The sealing wire 47 locks the nuts 45 against rotation.

Mounted in one end of the indicator hand 10 and adjacent the finger piece 48 on the hand is a plunger 49 having its inner end adapted to engage the sockets 42 in the blocks or stops 43. The finger piece is provided with a groove 50 adapted to receive a head 51 of the plunger 49. The finger piece 48 is movable longitudinally upon a pin 52 which is secured to one end of the dial hand 10 and is provided with a nut or head 53 at its opposite end mounted within a recess 54 in the finger piece 48.

A coil spring 55 surrounding the outer end of the pin 52 is adapted to maintain the finger piece inwardly towards the dial hand 10 and likewise the plunger 49 in engagement with the face of the dial 8 so that as the indicator hand is moved over said face the inner free end of the plunger 49 will fall within the sockets 42 of the stops 43 and automatically lock the dial hand in predetermined positions.

The locking of the stops 43 in position by means of the bolt 44 and the sealing wire 47 provides a sealing device which is concealed behind the indicator dial plate and protects the same from being tampered with. It further provides a device which makes it impossible to set the dial hand unless the knob is released by pulling it out which removes the stop in or plunger 49 in the dial handle. This further prevents any amount of gasoline being dispensed unless the dial handle 48 is released and operated.

In order to provide a seal for the upper end of the dispensing piston 21 when the upper end of the piston is located at the zero position I have provided an automatically operated valve 56 which is secured to a valve stem 57 slidable in a boss 58 projecting inwardly from a closure plate 59. The closure plate 59 is mounted within the cap 3 of the dispensing device. A coiled spring 60 surrounding the stem 57 engages the lower end of the boss 58 and the upper face of the valve 56 thereby maintaining said valve in its lowermost position. The valve is beveled as shown at 61 and is adapted to engage the beveled upper end 62 of the dispensing piston 21. When said piston is moved to its uppermost position, that is at the zero position, said piston is closed and prevents any liquid from flowing by way of the top of the piston through the dispensing chamber 20. This valve when located in operative position at the end of the dispensing piston 21 prevents liquid which has been equalized in the discharge chamber 20 from over-running the pump and motor and which will thus preclude the dispenser from discharging equal amounts. This valve also protects the outlet of the dispenser where a gravitational flow is provided and when the outlet is left open from dispensing more oil than is indicated. With the valve closed at the zero position of the dispensing piston excess oil in the receptacle 2 can find no outlet through the dispensing piston and will therefore flow back through the drain pipe 17 to the oil well.

What I claim is:

1. In combination with a power operated measuring and dispensing apparatus having an elevated liquid receptacle, means for filling the elevated liquid receptacle, a control means for setting the filling means in action, means adapted to be rotated for indicating the quantity of liquid to be dispensed from said receptacle, means actuated by the rotation of the indicating means for causing dispensing of a predetermined quantity of liquid from said receptacle, means automatically actuated by the rotation of the indicating means to prevent operation of the controlling means which sets the filling means in operation.

2. In combination with a power operated measuring and dispensing apparatus having an elevated liquid receptacle, means for filling the liquid receptacle, an electrical means adapted to be energized for operating the filling means, a switch controlling the electrical means, means adapted to be rotated for indicating the quantity of the liquid to be dispensed, means actuated by the rotation of the indicating means for causing dispensing of a predetermined quantity of liquid from said receptacle, means automatically actuated by the rotation of the indicating means to prevent operation of the switch control for energizing the electrical means.

3. In combination with a power operated and dispensing apparatus having an elevated liquid receptacle, means for filling said receptacle, an electrical means for causing operation of the filling means, means adapted to be rotated for indicating the quantity of liquid to be dispensed from said receptacle, means actuated by the rotation of the indicating means for causing a dispensing of a predetermined quantity of liquid from said receptacle, a switch comprising a pair of spaced apart contacts adapted when moved into engagement with each other to cause energization of the electrical means, and means adapted to be interposed between the contacts by the rotation of the indicating means to isolate one contact from the other contact and prevent energization of the electrical means.

4. In combination with a power operating measuring and dispensing apparatus having an elevated liquid receptacle, electrically operated means for causing filling of the receptacle with liquid, a circuit connected with the operating means, a switch comprising a movable contact and a fixed contact for controlling said circuit, means adapted to be rotated for indicating the quantity of liquid to be dispensed from said receptacle, means actuated by the indicating means for causing dispensing of liquid in predetermined quantities from said receptacle, a pivotally mounted bar adapted to be rocked by the indicating means and disposed between the fixed contact and the movable contact to maintain the circuit open when the indicating means has been rotated for dispensing liquid from the receptacle.

5. In combination with a power operated measuring and dispensing device having an elevated receptacle, an electrically operated means for causing filling of the receptacle, a circuit connected with the operating means, a movable contact adapted to be operated for closing the circuit, and means adapted to be rotated for indicating the quantity of liquid to be dispensed, means actuated by the indicating means for causing dispensing of liquid in predetermined quantities from said receptacle, a rock bar located adjacent the indicating means and provided with an opening adapted to aline with the contact, means movable through the opening for operating the contact when the indicating hand is in an inoperative position, said bar adapted to be rocked for causing the opening in the bar to be thrown out of alinement with the contact to prevent access to the movable contact when the indicating means is rotated.

6. In combination with a power operated measuring and dispensing device having an elevated liquid receptacle, electrically operated means for filling said receptacle, means for indicating the quantity of liquid to be dispensed from said receptacle and including a dial and a dial hand movable across the face of the dial, a shaft connected with the dial hand and operated thereby, a disc rigidly connected with the shaft, a lug projecting from one face of the disc, a pivotally mounted bar provided with a notch at its free end adapted to be engaged by the lug when the indicating means is in an inoperative position, a switch for controlling the electrical means, the other end of the bar adapted to coact with the switch and prevent operation of the same when the dial hand is moved to an operative position, said bar adapted to be rocked by the operation of the dial hand.

7. In combination with a power operated measuring and dispensing device, having an elevated liquid receptacle, electrically operated means for filling said receptacle with liquid, means for indicating a quantity of liquid to be dispensed from said receptacle and including a dial and a dial hand movable across the face of the dial, a shaft connected with the dial hand and operated thereby, a disc connected with the shaft for simultaneous rotation with the shaft, a lug projecting from one face of the disc, a pivotally mounted bar provided with a notch at its free end adapted to be engaged by the lug when the indicating means is in an inoperative position, means for dispensing quantities of liquid from the receptacle as indicated by the dial hand, an electric circuit for energizing the operating means for filling the receptacle, a switch for controlling said circuit, the other end of the bar adapted to aline with the switch and permit operation of the switch when the dial hand is in an inoperative position, said bar adapted to be oscillated by the movement of the dial hand to an operative position for locking the switch against movement.

8. In combination with a power operated measuring and dispensing device, having an elevated liquid receptacle, electrically operated means for filling said receptacle with liquid, means for indicating the quantity of liquid to be dispensed from said receptacle and including a dial and a dial hand movable across the face of the dial, a shaft connected with the dial hand and operated thereby, a disc connected with the shaft for simultaneous rotation with the shaft, a lug projecting from one face of the disc, a pivotally mounted bar provided with a notch at its free end adapted to be engaged by the lug when the indicating means is in an inoperative position, means for dispensing measured quantities of liquid from the receptacle as indicated by the dial hand, an electric circuit for energizing the operating means for filling the receptacle, a switch for controlling said circuit, a stationary contact in said circuit comprising a push button, a movable contact adapted to be moved into engagement with the stationary contact for closing the circuit, said bar being provided with a perforation adapted to aline with the path of the movable contact for permitting said contact to pass through the perforation and engage the stationary contact when the push button is operated and when the dial hand has been moved to its normal inoperative position, said bar being rocked through the movement of the hand to an operative position for placing the end of said bar across the perforation and preventing movement of the movable contact.

9. In a liquid dispensing device, means for indicating the quantity of liquid to be dispensed, said indicating means including a dial and a dial hand, and means for locking the dial hand in predetermined positions, said locking means comprising a spring pressed handle connected with one end of the dial hand and provided with a peripheral groove, a plunger having a head received by a groove for connecting the plunger to the handle operated by the handle, said dial being provided with a plurality of spaced pockets arranged circumferentially and adapted to be engaged by the inner end of the plunger.

10. In a liquid dispensing device, means for indicating the quantity of liquid to be dispensed, said indicating means including a dial and a dial hand, a spring pressed plunger mounted for reciprocation on the dial hand, said dial provided with a plurality of spaced pockets circumferentially arranged in the path of the plunger, stops or blocks located in the pockets and provided with recesses adapted to be engaged by the free end of the plunger, and means for locking the blocks at the rear of the dial against unauthorized removal from their respective pockets.

11. In a liquid dispensing device, means for indicating the quantity of liquid to be dispensed, said indicating means including a dial and a dial hand, a spring pressed plunger mounted for reciprocation on the dial hand, said dial provided with a plurality of spaced pockets circumferentially arranged in the path of the plunger, stops or blocks located in the pockets and provided with recesses adapted to be engaged by the free end of the plunger, and means for locking the blocks against unauthorized removal from their respective pockets, said locking means comprising bolts passing through perforations in the dial and secured to the rear face of the block, a nut having a threaded engagement with the rear projecting end of the bolt, and a sealing wire for locking the nut against movement.

12. In a liquid dispensing device, means for indicating the quantity of liquid to be dispensed, said indicating means including a dial and a dial hand, a spring pressed plunger mounted for reciprocation on the dial hand, said dial provided with a plurality of spaced pockets circumferentially arranged in the path of the plunger, stops or blocks located in the pockets and provided with recesses adapted to be engaged by the free end of the plunger, means for locking the blocks against unauthorized removal from their respective pockets, said means including means for sealing the locking means at the rear face of the dial.

ARCHIE J. SIMMONS.